(12) United States Patent
Aramata et al.

(10) Patent No.: US 7,776,473 B2
(45) Date of Patent: Aug. 17, 2010

(54) SILICON-SILICON OXIDE-LITHIUM COMPOSITE, MAKING METHOD, AND NON-AQUEOUS ELECTROLYTE SECONDARY CELL NEGATIVE ELECTRODE MATERIAL

(75) Inventors: Mikio Aramata, Annaka (JP); Koichiro Watanabe, Annaka (JP); Satoru Miyawaki, Annaka (JP); Meguru Kashida, Annaka (JP); Hirofumi Fukuoka, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/689,649

(22) Filed: Mar. 22, 2007

(65) Prior Publication Data
US 2007/0224508 A1    Sep. 27, 2007

(30) Foreign Application Priority Data
Mar. 27, 2006    (JP)    .............................. 2006-085488

(51) Int. Cl.
*H01M 4/58* (2010.01)
(52) U.S. Cl. .............................. 429/218.1; 429/231.95; 423/332
(58) Field of Classification Search .............. 429/218.1, 429/231.95; 423/332
See application file for complete search history.

(56) References Cited

U.S. PATENT DOCUMENTS

| | | | |
|---|---|---|---|
| 5,316,875 A | 5/1994 | Murai et al. | |
| 5,395,711 A | 3/1995 | Tahara et al. | |
| 5,478,671 A | 12/1995 | Idota | |
| 6,066,414 A | 5/2000 | Imoto et al. | |
| 6,383,686 B1 | 5/2002 | Umeno et al. | |
| 6,638,662 B2 | 10/2003 | Kaneda et al. | |
| 2003/0215711 A1 | 11/2003 | Aramata et al. | |
| 2004/0106040 A1* | 6/2004 | Fukuoka et al. | ............. 429/212 |
| 2006/0057463 A1* | 3/2006 | Gao et al. | ............. 429/231.95 |

FOREIGN PATENT DOCUMENTS

| | | |
|---|---|---|
| CN | 1407641 | 4/2003 |
| CN | 1505187 | 6/2004 |
| JP | 5-174818 | 7/1993 |
| JP | 5-226003 | 9/1993 |
| JP | 6-60867 | 3/1994 |
| JP | 10-294112 | 11/1998 |

(Continued)

OTHER PUBLICATIONS

Motoshi Kiribayashi, et al., "Evaluation of Lead-acid Battery for Idling Stop Vehicles by Simulated Test Patterns", GS News Technical Report, vol. 62, No. 2, ISSN: 1348-5725, Dec. 25, 2003, pp. 54-65 and 3 cover sheets (with English Abstract).
Chinese Office Action dated Feb. 5, 2010 (w/English Translation).

*Primary Examiner*—Jane Rhee
(74) *Attorney, Agent, or Firm*—Oblon, Spivak, McClelland, Maier & Neustadt, L.L.P.

(57) ABSTRACT

A silicon-silicon oxide-lithium composite comprises a silicon-silicon oxide composite having such a structure that silicon grains having a size of 0.5-50 nm are dispersed in silicon oxide, the silicon-silicon oxide composite being doped with lithium. Using the silicon-silicon oxide-lithium composite as a negative electrode material, a lithium ion secondary cell having a high initial efficiency and improved cycle performance can be constructed.

16 Claims, 1 Drawing Sheet

FOREIGN PATENT DOCUMENTS

| | | |
|---|---|---|
| JP | 11-86847 | 3/1999 |
| JP | 11-102705 | 4/1999 |
| JP | 2997741 | 11/1999 |
| JP | 2000-215887 | 8/2000 |
| JP | 2000-243396 | 9/2000 |
| JP | 2002-42806 | 2/2002 |
| JP | 2004-47404 | 2/2004 |
| JP | 2004-235057 | 8/2004 |
| JP | 2004-303597 | 10/2004 |

* cited by examiner

SILICON-SILICON OXIDE-LITHIUM COMPOSITE, MAKING METHOD, AND NON-AQUEOUS ELECTROLYTE SECONDARY CELL NEGATIVE ELECTRODE MATERIAL

CROSS-REFERENCE TO RELATED APPLICATION

This non-provisional application claims priority under 35 U.S.C. §119(a) on Patent Application No. 2006-085488 filed in Japan on Mar. 27, 2006, the entire contents of which are hereby incorporated by reference.

TECHNICAL FIELD

This invention relates to a silicon-silicon oxide-lithium composite useful as negative electrode active material for non-aqueous electrolyte secondary cells; a method for preparing the same; and a non-aqueous electrolyte secondary cell negative electrode material comprising the composite.

BACKGROUND ART

With the recent remarkable development of potable electronic equipment, communications equipment and the like, a strong demand for high energy density secondary batteries exists from the standpoints of economy and size and weight reductions. One prior art method for increasing the capacity of secondary batteries is to use oxides as the negative electrode material, for example, oxides of V, Si, B, Zr, Sn or the like or complex oxides thereof (see JP-A 5-174818 and JP-a 6-060867 corresponding to U.S. pat. no. 5,478,671), metal oxides quenched from the melt (JP-A 10-294112), silicon oxide (Japanese Patent No. 2,997,741 corresponding to U.S. pat. no. 5,935,711), and $Si_2N_2O$ and $GE_2N_2O$ (JP-A 11-102705 corresponding to U.S. pat. no. 6,066,414). Conventional methods of imparting conductivity to the negative electrode material include mechanical alloying of SiO with graphite, followed by carbonization (see JP-A 2000-243396 corresponding to U.S. pat. no. 6,638,662), coating of silicon particles with a carbon layer by chemical vapor deposition (JP-A 2000-215887 corresponding to U.S. pat. no. 6,383,686), and coating of silicon oxide particles with a carbon layer by chemical vapor deposition (JP-A 2002-042806).

The foregoing prior art methods are successful in increasing the charge/discharge capacity and energy density, but still leave several problems including insufficient cycle performance. They fail to fully meet the characteristics required in the market and are thus not necessarily satisfactory. A further improvement in energy density is desired.

In particular, Japanese Patent No. 2,997,741 uses silicon oxide as the negative electrode material in a lithium ion secondary cell to provide an electrode with a high capacity. As long as the present inventors have confirmed, there is left a room for further improvement as demonstrated by a still high irreversible capacity on the first charge/discharge cycle and cycle performance below the practical level. With respect to the technique of imparting conductivity to the negative electrode material, JP-A 2000-243396 suffers from the problem that solid-to-solid fusion fails to form a uniform carbon coating, resulting in insufficient conductivity. In the method of JP-A 2000-215887 which can form a uniform carbon coating, the negative electrode material based on silicon undergoes excessive expansion and contraction upon adsorption and desorption of lithium ions, meaning impractical operation, and loses cycle performance. Thus, the charge quantity must be limited. In JP-A 2002-042806, despite a discernible improvement of cycle performance, due to precipitation of silicon crystallites, insufficient structure of the carbon coating and insufficient fusion of the carbon coating to the substrate, the capacity gradually lowers as charge/discharge cycles are repeated, and suddenly drops after a certain number of charge/discharge cycles. This approach is thus insufficient for use in secondary cells. Even if this problem is overcome, the problem of low initial efficiency is left as long as the starting materials are silicon oxide-based materials.

The development of an electrode material having an increased charge/discharge capacity is very important and many engineers have been engaged in the research and development thereof. Under the circumstances, silicon and amorphous silicon oxides ($SiO_x$) are of great interest as the negative electrode active material for lithium ion secondary cells because of their large capacity. Only few of them have been used in practice because of their shortcomings including substantial degradation upon repeated charge/discharge cycles, that is, poor cycle performance, and in particular, low initial efficiency. Making investigations from such a standpoint with the target of improving cycle performance and initial efficiency, the inventor found that CVD treatment of silicon oxide powder to provide a carbon coat led to a substantial improvement in performance as compared with the prior art. However, further improvements in long-term stability and initial efficiency are demanded.

In an experiment where CVD-treated silicon oxide was used as the negative electrode active material for lithium ion secondary cells, a rapid drop of charge/discharge capacity occurred after repetition of many charge/discharge cycles. From the structural aspect, the inventor investigated the cause of this problem. It was found that substantial volume changes occur upon occlusion and release of a large amount of lithium to cause particles to collapse, and the occlusion of lithium causes silicon or silicon compound, having low conductivity in the original state, to expand in volume so that the electrode itself lowers its conductivity. This results in a reduced current collecting capability, which prevents lithium ions from migrating within the electrode, causing drops of cycle performance and efficiency.

Continuing a study on the structure which not only has a stable surface conductivity, but is also stable against volume changes associated with occlusion and release of lithium, the inventor found that the above problems of lithium ion secondary cell negative electrode active material are overcome by coating surfaces of silicon crystallites or microparticulates with an inert robust substance such as silicon dioxide, and fusing carbon to part of surfaces of composite particles for imparting conductivity to the surfaces. The resulting material has a consistent high charge/discharge capacity and achieves drastic improvements in cyclic charge/discharge operation and efficiency thereof. Making investigations to develop a lithium ion secondary cell negative electrode active material having better cycle performance, the inventor found that a conductive silicon composite characterized by coating surfaces of particles of the structure having silicon crystallites dispersed in a silicon-based compound with carbon has good cycle performance and is thus effective for lithium ion secondary cell negative electrodes. That is, the conductive silicon composite is obtained by finely dispersing silicon crystallites and/or microparticulates in a silicon compound, typically silicon dioxide, and coating surfaces of the composite with carbon so as to achieve partial fusion, as described in JP-A 2004-47404 (U.S. ser. no. 10/246,426, Published Application no. 2003-215711; China Patent Application No. 02155814.0, Published Application No. 1513922). This composite material is improved in initial efficiency, but its initial efficiency is low as compared with the current carbon-based materials. Since the composite material had a satisfactory capacity and cycle performance, it was expected that its low initial efficiency could be cleared by various known approaches for increasing initial efficiency, for example, incorporating metallic lithium and/or organolithium compounds. Reference should be made to JP-A 11-86847, JP-A 2004-235057, and JP-A 2004-303597 for the addition of metallic lithium; and JP-A 5-226003 corresponding to U.S. pat. no. 5,316,875 and GS News Technical Report, Vol. 62-2, p. 63 (2003) for the addition of organic lithium.

However, in the actual process of manufacturing lithium ion secondary cells, the inclusion of the lithium addition step raises many problems. There remained a need for a negative electrode material which is improved in initial efficiency while maintaining the desired characteristics of conductive composite material.

SUMMARY OF THE INVENTION

A silicon-silicon oxide composite derived from silicon oxide or silicon oxide-based material is regarded promising because of its charge/discharge capacity which is several times the capacity of currently prevailing graphite-based materials, but suffers from low initial efficiency. The present invention relates to a silicon-based composite which has improved the initial efficiency of the silicon-silicon oxide composite. An object of the present invention is to provide a silicon-silicon oxide-lithium composite containing amorphous silicon and/or crystallite silicon, and a silicon-silicon oxide-lithium composite coated with carbon such that carbon is partially fused thereto; a method for preparing the same; and a non-aqueous electrolyte secondary cell negative electrode material.

The inventors have found that when a silicon-silicon oxide composite having (metallic) silicon dispersed in silicon oxide is doped with lithium, there is obtained a silicon-silicon oxide-lithium composite which can be used as a negative electrode active material to construct a lithium ion secondary cell having a high initial efficiency and improved cycle performance. Herein, lithium doping is also referred to as lithiation.

Therefore, the present invention provides a silicon-silicon oxide-lithium composite, a method for preparing the same, and a non-aqueous electrolyte secondary cell negative electrode material, as defined below.

In one aspect, the invention provides a silicon-silicon oxide-lithium composite in the form of a silicon-silicon oxide composite doped with lithium, having such a structure that silicon grains having a size of 0.5 to 50 nm in an atomic order and/or crystallite state are dispersed in silicon oxide.

In a preferred embodiment, the silicon grains have a size of 0.5 to 50 nm, and the silicon oxide is silicon dioxide which is doped with lithium. In a preferred embodiment, the composite is in particle form, and surfaces of particles are coated with carbon in a coating weight of 5 to 50% by weight based on the weight of the surface-coated composite particles.

In another aspect, the invention provides a method for preparing a silicon-silicon oxide-lithium composite, comprising doping silicon oxide with lithium at a temperature equal to or lower than 1,300° C., using metallic lithium and/or an organolithium compound as a lithiating agent.

In a further aspect, the invention provides a method for preparing a conductive silicon-silicon oxide-lithium composite, comprising providing a silicon-silicon oxide-lithium composite ground to a predetermined particle size, and performing thermal CVD on the silicon-silicon oxide-lithium composite particles at 900° C. to 1,400° C. with an organic hydrocarbon gas and/or vapor, for coating the composite particles with carbon in a coating weight of 5 to 50% by weight based on the weight of the surface-coated composite particles.

Also contemplated herein is a negative electrode material for use in a non-aqueous electrolyte secondary cell, comprising the silicon-silicon oxide-lithium composite defined above. Typically, the negative electrode material is a mixture of the silicon-silicon oxide-lithium composite defined above and a conductive agent, the mixture containing 1 to 60% by weight of the conductive agent and having a total carbon content of 5 to 90% by weight.

BENEFITS OF THE INVENTION

Using the silicon-silicon oxide-lithium composite of the invention as a negative electrode material, a non-aqueous electrolyte secondary cell can be constructed which has a high initial efficiency and improved cycle performance.

DESCRIPTION OF THE PREFERRED EMBODIMENTS

Figure 1:
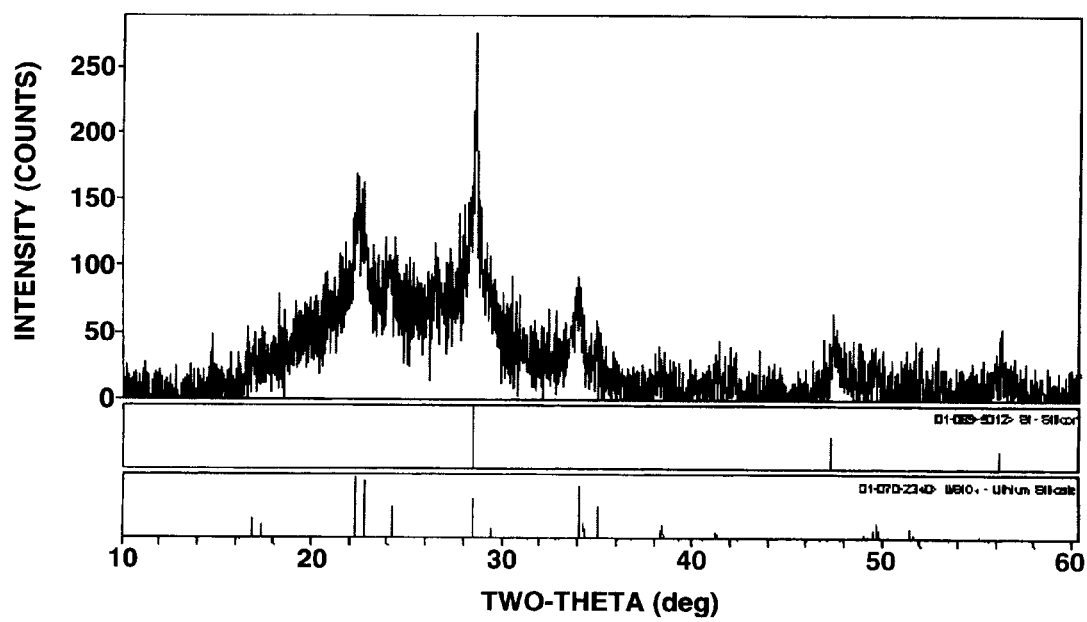
FIG. 1 is a X-ray diffraction diagram of the low-temperature reaction product of silicon oxide and metallic lithium in Reference Example.

As used herein, the term "conductive" refers to electrical conduction.

The silicon-silicon oxide-lithium composite of the invention is a (metallic) silicon-silicon oxide composite doped with lithium, having such a microstructure that silicon in an atomic order and/or crystallite state are dispersed in silicon oxide. The (metallic) silicon grains preferably have a size of about 0.5 to about 50 nm, more preferably about 0.5 to about 35 nm, and even more preferably about 0.5 to about 20 nm. The size of silicon grains refers to the size of silicon crystals as determined by X-ray diffraction analysis, and is desirably so small that no diffraction peak attributable to Si(111) is observable, or if a diffraction peak attributable to Si(111) is observed, such that the size of silicon crystals as computed by the Scherrer equation from the half-value width of the diffraction line falls within the range of 0.5 to 50 nm as described above.

The composite particles preferably have an average particle size of 1 to 50 μm, more preferably 5 to 20 μm. It is noted that the average particle size of the composite is determined as a weight average diameter $D_{50}$ (particle diameter at 50% by weight cumulative, or median diameter) upon measurement of particle size distribution by laser diffractometry.

Preferably the silicon-silicon oxide-lithium composite has a (metallic) silicon content of 20 to 44% by weight, more preferably 20 to 35% by weight, and even more preferably 25 to 30% by weight; a silicon oxide content of 55 to 70% by weight, more preferably 60 to 65% by weight; and a lithium content of 1 to 20% by weight, more preferably 5 to 20% by weight, and even more preferably 10 to 15% by weight.

The silicon-silicon oxide-lithium composite is a lithium-containing silicon composite which is prepared by subjecting silicon oxide powder typically having the general formula: SiOx wherein 1≦x<1.6 and metallic lithium and/or an organolithium compound to uniform reaction at a fully controlled temperature. Since the composite has a low conductivity, it is recommended to cover surfaces of the composite with a conductive coating. The type of conductive agent used herein is not critical as long as it is a conductive material which does not undergo decomposition or alteration in the cell. Illustrative conductive agents include metals such as Al, Ti, Fe, Ni, Cu, Zn, Ag, and Sn, and carbon. Of these, carbon coatings are preferred because of ease of vapor deposition and a high level of conductivity. Specifically, carbon coating is applied to the composite by thermal CVD (chemical vapor deposition), obtaining a surface conductive silicon-silicon oxide-lithium composite.

Preferably, the amount of carbon coated or vapor deposited on the conductive silicon composite powder is 5 to 50% by weight based on the conductive silicon composite powder (i.e., silicon composite powder which has been surface coated with carbon by thermal CVD or the like). The preferred carbon coating amount is 5 to 40% by weight and especially 5 to 25% by weight. If the amount of carbon coated or deposited is less than 5 wt %, the silicon composite powder is improved in conductivity, but may offer unsatisfactory cycle performance when used to construct a lithium ion secondary cell. A carbon coating amount of more than 50 wt % indicates a too large proportion of carbon which may reduce the negative electrode capacity.

It is desired that the conductive silicon composite powder have an electrical conductivity of at least $1 \times 10^{-6}$ S/m, especially at least $1 \times 10^{-4}$ S/m. With an electrical conductivity of less than $1 \times 10^{-6}$ S/m, the electrode is less conductive and may provide degraded cycle performance when used as the negative electrode in a lithium ion secondary cell. As used herein, the "electrical conductivity" is determined by filling a four-terminal cylindrical cell with a powder to be tested, conducting current flow through the powder, and measuring the voltage drop thereacross.

Preferred embodiments of the silicon composite of the invention are shown below.

(i) A silicon-silicon oxide-lithium composite which is a composite comprising an oxygen-containing silicon compound and lithium wherein the amount of lithium added provides an atomic ratio of lithium to oxygen is equal to or less than 2/1, (ii) A silicon-silicon oxide-lithium composite in which on analysis by x-ray diffraction (Cu—Kα) using copper as the counter cathode, a diffraction peak attributable to Si(111) and centering near 2θ=28.4° is not observed, or crystallites have a size of 0.5 to 50 nm as determined by Scherrer equation based on the spread of the diffraction peak.

(iii) A silicon-silicon oxide-lithium composite coated with carbon by CVD, in which an observation of a particle surface portion under tem reveals that carbons are in laminar arrangement which helps enhance conductivity, and inside carbons are in fused state to silicon dioxide, which prevents the carbon layer from separating away and ensures stable conductivity.

(iv) A conductive silicon-silicon oxide-lithium composite in which on Raman spectroscopy, a spectrum attributable to graphite appears near 1580 cm$^{-1}$, indicating that part or all of the carbon has the graphite structure.

Now, it is described how to prepare the silicon-silicon oxide-lithium composite of the invention.

The silicon-silicon oxide-lithium composite of the invention is obtained by doping a silicon oxide (powder) having the general formula: SiOx wherein $1 \leq x < 1.6$ with lithium (lithiation) using metallic lithium and/or an organolithium compound. When this composite is used as a negative electrode material in a lithium ion secondary cell, it provides a siliceous negative electrode material which possesses a high capacity and good cycle performance, and has overcome the drawback of a noticeable initial irreversible capacity from which prior art silicon oxide and/or silicon oxide-based negative electrode materials suffer, that is, has a reduced initial irreversible capacity.

After silicon oxide and/or silicon oxide-based material is ground and sized to a desired particle size distribution, it is combined with metallic lithium as a lithiating agent in an inert gas atmosphere for reaction, whereby silicon oxide undergoes disproportionation into silicon (Si) and silicon dioxide ($SiO_2$) under moderate conditions and doped with lithium at the same time. Since this reaction is an exothermic reaction to generate substantial heat, sometimes chain reaction takes place to create an ignited state. If the preparation process proceeds by way of an ignited state, silicon crystals grow excessively so that an inactive, insulating lithium silicate layer which is present as having compensated the irreversible capacity becomes thick whereas the current collecting capability of silicon phase is reduced. The resulting silicon-silicon oxide-lithium composite provides a low capacity when used as a lithium ion secondary cell negative electrode material. For this reason, the reaction must be effected at a relatively low temperature equal to or lower than 1,200° C. while preventing creation of an ignited state.

The rate-determining step of lithiation reaction is diffusion of lithium into the solid silicon oxide and/or silicon oxide-based material. If unreacted lithium is left behind, it is undesirable in both property and safety aspects. Then the reaction should be controlled such that the amount of metallic lithium added is Li/O<2 and lithium is uniformly distributed. It is thus preferred that the silicon oxide and/or silicon oxide-based material to be lithiated be fed in powder form. While metallic lithium is generally available in powder, foil or mass form, the use of powder form, for example, stabilized lithium powder SLMP (FMC Corp.) is preferred.

More particularly, the silicon oxide and/or silicon oxide-based material and the lithiating agent (i.e., metallic lithium) both having the desired particle size distribution are premixed in an inert gas atmosphere and mechanically mixed for reaction in a mixer with an effective heat dissipation capability. If mixing is performed in a short heat dissipating state, for example, relatively large amounts are mixed in an iron mortar, the mixture initiates reaction abruptly, creating an ignited state. Once reaction occurs in this way, silicon grows into large crystals due to abrupt disproportionation. Inversely, a layer of lithium silicate remaining as an oxygen compound becomes so thick that it acts as an insulator to reduce a current collecting capability, eventually inviting a drop of capacity. For this reason, the abrupt reaction should be avoided.

The reaction of adding and doping Li to silicon oxide (SiO) is presumed to follow the reaction scheme:

$$4Li + 4SiO \rightarrow Li_4SiO_4 + 3Si$$

because formation of $Li_4SiO_4$ is confirmed by X-ray diffraction of the product. This reaction is an exothermic reaction to generate substantial heat. Once the reaction proceeds abruptly (or ignites), the ignition reaction propagates throughout the system, disrupting temperature control. If such abrupt reaction proceeds, crystals of (metallic) silicon grow large in the product, and the proportion of $SiO_2$ phase ($Li_4SiO_4$) which is an insulator becomes relatively large, leading to a loss of current collecting capability and a lowering of the charge/discharge capacity as secondary cell negative electrode material. For this reason, the lithiation reaction must be effected at low temperature and under moderate conditions.

The reactor used should be sealed with an inert gas, designed for effective heat dissipation (because significant exothermic reaction occurs therein), and capable of mixing under high shear stresses. No other limits are imposed on the reactor. One exemplary compact reactor is a planetary ball mill featuring a tight closure, potential heat dissipation of balls, and high shear stresses. In a ball mill, the reaction is performed at room temperature (25° C.). Since the temperature within the jar rises due to the reaction heat, it is desired to control the temperature within the jar at about 40 to 120° C., more preferably about 60 to 100° C. during the reaction.

Mixing/reaction is carried out in a device which applies high shear stresses in an inert gas atmosphere and provides for effective heat dissipation. One exemplary compact reactor is a planetary ball mill. In one exemplary procedure, predetermined amounts of metallic lithium and silicon oxide and/or silicon oxide-based material are weighed in a globe box under an argon blanket. They are premixed and fed into a jar of a planetary ball mill together with a predetermined number of balls, which is tightly closed. The jar is then mounted on the planetary ball mill, which is operated for milling and reaction for a predetermined time. The key features in the course of reaction for determining the characteristics of the product include the heat release, heat transfer, and shear stress, and the characteristics of the product vary with the charge, rotational speed and/or milling time. These parameters are determined by carrying out a preliminary test and analyzing the characteristics of the test product by X-ray diffractometry or the like.

The reaction is a solid reaction between the solid siliceous material such as silicon oxide and metallic lithium (or can be a solid-liquid reaction in the event metallic lithium melts during reaction). However, since the rate of diffusion into a solid is generally low, it is difficult for metallic lithium to penetrate uniformly into the fully solid siliceous material such as silicon oxide. It is then necessary for safety sake that the amount of metallic lithium added is controlled at a relatively low level rather than to supplement the overall irreversible capacity. One effective approach for complementing this shortage is by adding an organolithium compound (e.g., alkyllithium or aryllithium) to complement a lithium value after the addition and reaction of metallic lithium. This approach is effective for complementing a shortage because a consideration for the removal of decomposed products is otherwise necessary.

To impart conductivity to the silicon-silicon oxide-lithium composite thus obtained, a carbon coat may be formed on composite particles by thermal CVD, specifically by heating at a temperature of 900 to 1,400° C. and feeding an organic matter gas or vapor. The time of thermal CVD is determined as appropriate relative to the amount of carbon deposited. During the treatment, particles sometimes agglomerate together, and if so, the agglomerates are subsequently disintegrated on a ball mill or the like. If desired, thermal CVD is similarly repeated again. Specifically, the silicon-silicon oxide-lithium composite is disintegrated, and then heat treated in a reactor, which has been heated at 800 to 1,400° C. in an inert gas stream, at a temperature in the range of 800 to 1,400° C., preferably 900 to 1,300° C., more preferably 900 to 1,200° C. In an atmosphere containing at least an organic matter gas or vapor. Heat treatment temperatures below 800° C. achieve insufficient fusion of conductive carbon coat to silicon composite and insufficient arrangement (crystallization) of carbon atoms and are inefficient in that formation of microscopic silicon cells takes a longer time. Inversely, at temperatures above 1,400° C., the silicon dioxide moiety becomes more structured to interfere with migration of lithium ions, adversely affecting the function of a lithium ion secondary cell.

The organic material to generate the organic matter gas is selected from those materials capable of producing carbon (graphite) through pyrolysis at the heat treatment temperature, especially in a non-oxidizing atmosphere. Exemplary are hydrocarbons such as methane, ethane, ethylene, acetylene, propane, butane, butene, pentane, isobutane, and hexane alone or in admixture of any, and monocyclic to tricyclic aromatic hydrocarbons such as benzene, toluene, xylene, styrene, ethylbenzene, diphenylmethane, naphthalene, phenol, cresol, nitrobenzene, chlorobenzene, indene, coumarone, pyridine, anthracene, and phenanthrene alone or in admixture of any. Also, gas light oil, creosote oil and anthracene oil obtained from the tar distillation step are useful as well as naphtha cracked tar oil, alone or in admixture.

For the heat treatment of the silicon-silicon oxide-lithium composite with organic matter gas, any desired reactor having a heating mechanism may be used in a non-oxidizing atmosphere. Depending on a particular purpose, a reactor capable of either continuous or batchwise treatment may be selected from, for example, a fluidized bed reactor, rotary furnace, vertical moving bed reactor, tunnel furnace, batch furnace and rotary kiln. The fluidizing gas used herein may be the aforementioned organic gas alone or in admixture with a non-oxidizing gas such as Ar, He, $H_2$ or $N_2$. More efficiently the conductive carbon coating is formed when the linear velocity u (m/sec) of fluidizing gas is selected such that its ratio to the minimum fluidization velocity $u_{mf}$ is in the range $1.5 \leq u/u_{mf} \leq 5$. If $u/u_{mf} < 1.5$, insufficient fluidization may result in variant conductive coatings. If $u/u_{mf} > 5$, on the other hand, secondary agglomeration of particles may occur, failing to form uniform conductive coatings. It is noted that the minimum fluidization velocity $u_{mf}$ is dependent on the size of particles, treatment temperature, treatment atmosphere and the like. The minimum fluidization velocity $u_{mf}$ is defined, in a test of gradually increasing the linear velocity of fluidizing gas to a powder bed, as the linear velocity of fluidizing gas when the pressure loss across the powder is equal to W/A wherein W is the weight of the powder and A is the cross-sectional area of the fluidized bed. The minimum fluidization velocity $u_{mf}$ is usually 0.1 to 30 cm/sec, preferably 0.5 to 10 cm/sec. To achieve such a minimum fluidization velocity $u_{mf}$, the powder usually have a particle size of 0.5 to 100 μm, preferably 5 to 50 μm. A particle size of less than 0.5 μm has a risk of secondary agglomeration preventing surfaces of discrete particles from effective treatment. Particles with a particle size of more than 100 μm may be difficult to uniformly coat on the surface of a current collector in a lithium ion secondary cell.

According to the invention, the silicon-silicon oxide-lithium composite powder may be used as a negative electrode material, specifically a negative electrode active material to construct a non-aqueous electrolyte secondary cell, especially a lithium ion secondary cell, having a high capacity, good cycle performance and improved initial efficiency.

The lithium ion secondary cell thus constructed is characterized by the use of the silicon-silicon oxide-lithium composite as the negative electrode active material while the materials of the positive electrode, electrolyte, and separator and the cell design are not critical. For example, the positive electrode active material used herein may be selected from transition metal oxides such as $LiCoO_2$, $LiNiO_2$, $LiMn_2O_4$, $V_2O_5$, $MnO_2$, $TiS_2$ and $MoS_2$ and chalcogen compounds. The electrolytes used herein may be lithium salts such as lithium perchlorate in non-aqueous solution form. Examples of the non-aqueous solvent include propylene carbonate, ethylene carbonate, dimethoxyethane, γ-butyrolactone and 2-methyltetrahydrofuran, alone or in admixture. Use may also be made of other various non-aqueous electrolytes and solid electrolytes.

When a negative electrode is prepared using the inventive silicon-silicon oxide-lithium composite powder, a conductive agent such as graphite may be added to the powder. The type of conductive agent used herein is not particularly limited as long as it is an electronically conductive material which does not undergo decomposition or alteration in the cell. Illustrative conductive agents include metals in powder or fiber form such as Al, Ti, Fe, Ni, Cu, Zn, Ag, Sn and Si, natural graphite, synthetic graphite, various coke powders, meso-phase carbon, vapor phase grown carbon fibers, pitch base carbon fibers, PAN base carbon fibers, and graphite obtained by firing various resins.

The amount of conductive agent added is preferably 1 to 60% by weight, more preferably 5 to 60% by weight, even more preferably 10 to 50% by weight, most preferably 20 to 50% by weight of the negative electrode-forming mixture of silicon-silicon oxide-lithium composite powder plus conductive agent. A mixture with less than 1 wt % of the conductive agent may not withstand the expansion and contraction associated with charge/discharge cycles, whereas a mixture with more than 60 wt % of the conductive agent may have a reduced charge/discharge capacity. The total amount of carbon in the negative electrode-forming mixture is preferably 5 to 90% by weight, more preferably 25 to 90% by weight, even more preferably 30 to 50% by weight. A mixture with less than 5 wt % of carbon may not withstand the expansion and contraction associated with charge/discharge cycles, whereas a mixture with more than 90 wt % of carbon may have a reduced charge/discharge capacity.

EXAMPLE

Examples of the invention are given below by way of illustration and not by way of limitation. In Examples, all percents are by weight. The average particle size is determined as a cumulative weight average diameter $D_{50}$ (or median diameter) upon measurement of particle size distribution by laser diffractometry.

In the lithiation step of examples 1 to 3, the temperature within the jar of a planetary ball mill was controlled within the range of 60 to 100° C.

Reference Example 1

The structure of a conductive silicon composite prepared according to the invention is described by referring to an exemplary silicon-silicon oxide-lithium composite obtained from silicon oxide (SiOx).

Silicon oxide (SiOx, x=1.02) was milled in a ball mill, using hexane as a dispersing medium, to an average particle size of 5 μm. In a globe box under an argon blanket, a portion (8.7 g) of the silicon oxide powder was weighed and placed in a 50-g glass vial. Stabilized lithium powder SLMP (FMC Corp.), 1.3 g, was added to the vial, which was closed with a cap and manually shaken for mixing. The mixture was transferred to a 500-ml stainless steel jar of a planetary ball mill PM-100 (Retsch GmbH), containing ten stainless steel balls of each 32 g. The jar was closed, taken out of the globe box, and mounted in place on the planetary ball mill PM-100. The jar was rotated at a rotational speed of 500 rpm in forward and backward directions each for 10 minutes while maintaining an internal temperature of 60 to 100° C. The jar was allowed to cool, after which the silicon-silicon oxide-lithium composite was taken out. It was analyzed by X-ray diffractometry using Cu—Kα ray, with the data shown in FIG. 1. A broad diffraction peak attributable to Si(111) was observed at 2θ=28.4°, and silicon crystals had a size of 50 angstroms (Å) as determined by the Scherrer equation from the half-value width of the diffraction peak.

Figure 2:
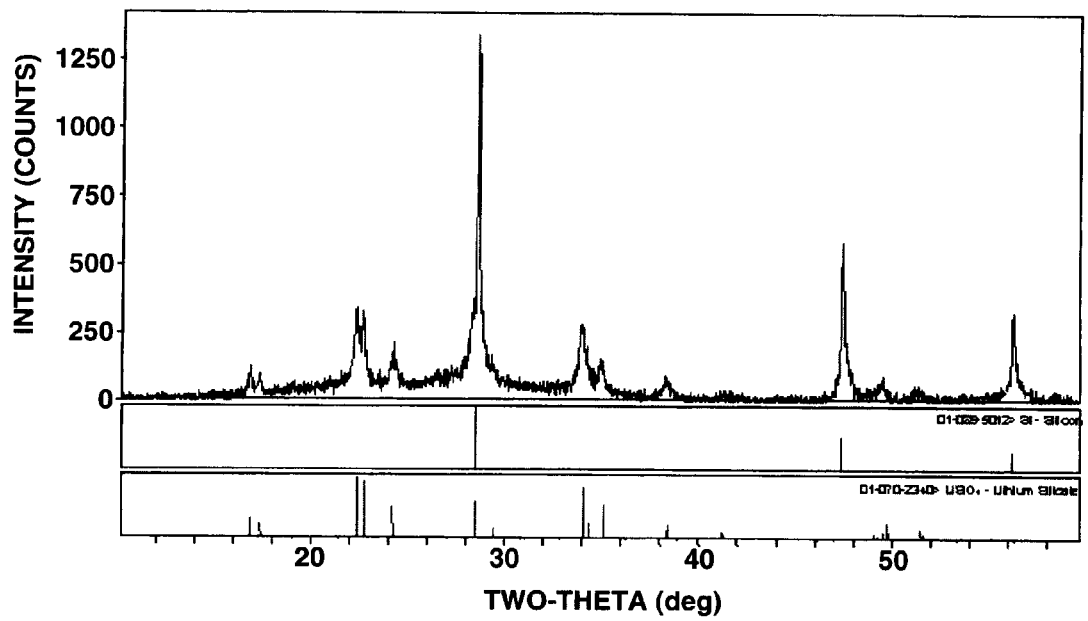
FIG. 2 is a X-ray diffraction diagram of the ignited state reaction product of silicon oxide and metallic lithium in Reference Example.

In another run, silicon oxide (SiOx, x=1.02) was similarly milled in a ball mill, using hexane as a dispersing medium, to an average particle size of 5 μm. In a globe box under an argon blanket, a portion (8.7 g) of the silicon oxide powder was weighed and placed in a 50-g glass vial. Stabilized lithium powder SLMP (FMC Corp.), 1.3 g, was added to the vial, which was closed with a cap and manually shaken for mixing. The mixture was transferred to an iron mortar having an internal volume of 500 ml. Milling was commenced with a pestle. Ignition reaction took place at the interface between the pestle and the mortar surface. Unreacted portions were moved to the ignited portion for reaction so that eventually this reaction prevails throughout the mortar and the mixture became uniform. After cooling, the product was taken out of the glove box, and similarly analyzed by X-ray diffractometry, with the data shown in FIG. 2. As opposed to FIG. 1, a sharp diffraction peak attributable to Si(111) was observed at 2θ=28.4° in FIG. 1. Silicon crystals had a size of 550 Å or greater as determined by the Scherrer equation from the half-value width of the diffraction peak. Additionally, a diffraction peak attributable to $Li_4SiO_4$ was also observed. These data demonstrate that when reaction takes place at a high temperature, silicon crystals grow and an insulating layer of silicate becomes relatively thick. The product is thus poor in current collection when used as a negative electrode material for a lithium ion secondary cell, eventually leading to a loss of capacity.

Example 1

Silicon oxide (SiOx, x=1.02) was milled in a ball mill, using hexane as a dispersing medium, to an average particle size of 5 μm. In a globe box under an argon blanket, a portion (8.7 g) of the silicon oxide powder was weighed and placed in a glass vial with an internal volume of about 50 ml. Stabilized lithium powder SLMP (FMC Corp.), 1.3 g, was added to the vial, which was closed with a cap and manually shaken for mixing. The mixture was transferred to a 500-ml stainless steel jar of a planetary ball mill PM-100 (Retsch GmbH), containing ten stainless steel balls of each 32 g. The jar was closed, taken out of the globe box, and mounted in place on the planetary ball mill PM-100. The jar was rotated at a rotational speed of 500 rpm in forward and backward directions each for 10 minutes. The jar was allowed to cool, after which the silicon-silicon oxide-lithium composite was taken out. It was analyzed by X-ray diffractometry. Silicon crystallites ((111) face) had a size of 50 Å as determined by the Scherrer equation.

The silicon-silicon oxide-lithium composite thus obtained was evaluated as the negative electrode active material for a lithium ion secondary cell. The results are shown in Table 1.

Cell test

The evaluation of composite powder as the negative electrode active material for a lithium ion secondary cell was carried out by the following procedure which was common to all Examples and Comparative Examples.

A mixture was first obtained by adding flake synthetic graphite powder (average particle diameter $D_{50}$=5 μm) to the siliceous negative electrode material (silicon-silicon oxide-lithium composite in Examples) in such amounts that the total of carbon in synthetic graphite and carbon deposited on the silicon composite was 42%. A polyimide resin varnish Rikacoat SN-20 (New Japan Chemical Co., Ltd.) was added in an amount of 10% as solids to the mixture to form a slurry below 20° C. Further N-methylpyrrolidone was added for viscosity adjustment. Immediately thereafter, the slurry was coated onto a copper foil of 20 μm thick and dried at 120° C. for one hour. Using a roller press, the coated foil was shaped under pressure into an electrode sheet, of which 2 cm² discs were punched out as the negative electrode.

To evaluate the charge/discharge performance of the negative electrode, a test lithium ion secondary cell was constructed using a lithium foil as the counter electrode. The electrolyte solution used was a non-aqueous electrolyte solution of lithium phosphorus hexafluoride in a 1/1 (by volume) mixture of ethylene carbonate and 1,2-dimethoxyethane in a concentration of 1 mol/liter. The separator used was a microporous polyethylene film of 30 μm thick.

The lithium ion secondary cell thus constructed was allowed to stand overnight at room temperature. Using a secondary cell charge/discharge tester (Nagano K.K.), a charge/discharge test was carried out on the cell. Charging was conducted with a constant current flow of 3 mA until the voltage of the test cell reached 0 V, and after reaching 0 V, continued with a reduced current flow so that the cell voltage was kept at 0 V, and terminated when the current flow decreased below 100 μA. Discharging was conducted with a constant current flow of 3 mA and terminated when the cell voltage rose above 2.0 V, from which a discharge capacity was determined.

By repeating the above operations, the charge/discharge test on the lithium ion secondary cell was carried out 50 cycles.

Example 2

Silicon oxide (SiOx, x=1.02) was milled in a ball mill, using hexane as a dispersing medium, to an average particle size of 5 μm. In a globe box under an argon blanket, a portion (8.7 g) of the silicon oxide powder was weighed and placed in a glass vial with an internal volume of about 50 ml. Stabilized lithium powder SLMP (FMC Corp.), 1.0 g, was added to the vial, which was closed with a cap and manually shaken for mixing. The mixture was transferred to a 500-ml stainless steel jar of a planetary ball mill PM-100 (Retsch GmbH), containing ten stainless steel balls of each 32 g. The jar was closed, taken out of the globe box, and mounted in place on the planetary ball mill PM-100. The jar was rotated at a rotational speed of 500 rpm in forward and backward directions each for 10 minutes. The jar was allowed to cool, after which the silicon-silicon oxide-lithium composite was taken out. It was analyzed by X-ray diffractometry. Silicon crystallites ((111) face) had a size of 40 Å as determined by the Scherrer equation.

The silicon-silicon oxide-lithium composite thus obtained was evaluated as the negative electrode active material for a lithium ion secondary cell. The results are shown in Table 1.

Example 3

As in Example 2, silicon oxide (SiOx, x=1.02) was milled in a ball mill, using hexane as a dispersing medium, to an average particle size of 5 μm. In a globe box under an argon blanket, a portion (8.7 g) of the silicon oxide powder was weighed and placed in a glass vial with an internal volume of about 50 ml. Stabilized lithium powder SLMP (FMC Corp.), 1.0 g, was added to the vial, which was closed with a cap and manually shaken for mixing. The mixture was transferred to a 500-ml stainless steel jar of a planetary ball mill PM-100 (Retsch GmbH), containing ten stainless steel balls of each 32 g. The jar was closed, taken out of the globe box, and mounted in place on the planetary ball mill PM-100. The jar was rotated at a rotational speed of 500 rpm in forward and backward directions each for 10 minutes. The jar was allowed to cool, after which the silicon-silicon oxide-lithium composite was taken out. The composite was then placed in a 200-ml separable flask, to which 50 ml of toluene was added. With thorough stirring, the flask was purged with argon. While the flask was cooled, 10 g of butyllithium diluted with toluene was slowly added dropwise for reaction. The completion of reaction was confirmed, after which the solvent was removed, leaving a silicon-silicon oxide-lithium composite. It was analyzed by X-ray diffractometry. Silicon crystallites ((111) face) had a size of 40 Å as determined by the Scherrer equation.

The silicon-silicon oxide-lithium composite thus obtained was evaluated as the negative electrode active material for a lithium ion secondary cell. The results are shown in Table 1.

Comparative Example 1

As in Example 1, silicon oxide (SiOx, x=1.02) was milled in a ball mill, using hexane as a dispersing medium, to an average particle size of 5 μm. In a globe box under an argon blanket, a portion (8.7 g) of the silicon oxide powder was weighed and placed in a 50-g glass vial. Stabilized lithium powder SLMP (FMC Corp.), 1.3 g, was added to the vial, which was closed with a cap and manually shaken for mixing. The mixture was transferred to an iron mortar having an internal volume of 500 ml. Milling was commenced with a pestle. Ignition reaction accompanied with light emission took place near the interface between the pestle and the mortar surface. Using a spatula, unreacted portions at the periphery were moved over the ignited portion for reaction so that eventually this reaction prevails uniformly throughout the mortar. After cooling, the product was fully disintegrated and taken out of the glove box. It was analyzed by X-ray diffractometry, finding that silicon crystals had a size of 550 Å as determined by the Scherrer equation from the half-value width of the diffraction peak.

The silicon oxide powder thus obtained was evaluated as the negative electrode active material for a lithium ion secondary cell. The results are shown in Table 1.

Comparative Example 2

Silicon oxide (SiOx, x=1.02) was milled in a ball mill, using hexane as a dispersing medium. By filtering the suspension and removing the solvent in a nitrogen atmosphere, a powder with an average particle size of about 5 μm was obtained.

The silicon oxide powder thus obtained was evaluated as the negative electrode active material for a lithium ion secondary cell. The results are shown in Table 1.

TABLE 1

|  | Example | | | Comparative Example | |
| --- | --- | --- | --- | --- | --- |
|  | 1 | 2 | 3 | 1 | 2 |
| Li added (wt %) | 13.0 | 10.3 | 11.5 | 13.0 | 0 |
| Initial charge capacity (mAh/g) | 880 | 990 | 920 | 450 | 1330 |
| Initial discharge capacity (mAh/g) | 750 | 790 | 780 | 400 | 810 |
| Initial efficiency (%) | 85 | 80 | 85 | 88 | 61 |
| Cycle retention at 50th cycle (%) | 85 | 88 | 88 | 20 | 61 |

Japanese Patent Application No. 2006-085488 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a silicon-silicon dioxide-lithium composite, comprising:

mixing silicon oxide having the general formula; SiOx wherein 1≦x<1.6 with metallic lithium and/or an organolithium compound as a lithiating agent in an inert gas atmosphere for reaction, whereby the silicon oxide undergoes disproportionation into silicon and silicon dioxide doped with lithium at the same time to form $Li_4SiO_4$ and silicon as a silicon-silicon dioxide-lithium composite having such a structure that silicon grains having a size of 0.5 to 50 nm in an atomic order and/or crystallite state are dispersed in silicon dioxide, wherein said reaction between silicon oxide and metallic lithium and/or the organolithium compound is conducted by feeding the mixture of silicon oxide and metallic lithium and/or the organolithium compound in a jar of a planetary ball mill, operated for milling and reaction, so that the temperature within a jar is controlled at about 40 to 120° C. during the reaction.

2. The method of claim 1, wherein the reaction is effected at a temperature equal to or lower than 1200° C.

3. The method of claim 1, wherein the metallic lithium is a stabilized lithium powder.

4. The method of claim 1, wherein the reaction is controlled such that the amount of metallic lithium is Li/O<2.

5. The method of claim 1, wherein the reaction is conducted by using reactor which is sealed with an inert gas, designed for heat dissipation, and capable of mixing under high shear stresses.

6. The method of claim 1, wherein the silicon-silicon dioxide-lithium composite has a metallic silicon content of 20 to 44% by weight, silicon dioxide content of 55 to 70% by weight, and lithium content of 1 to 20% by weight, and an average particle size of 1 to 50 μm.

7. A method for preparing a conductive silicon-silicon dioxide-lithium composite, comprising:

mixing silicon oxide having the general formula: SiOx wherein 1≦x<1.6 with metallic lithium and/or an organolithium compound as a lithiating agent in an inert gas atmosphere for reaction whereby the silicon oxide undergoes disproportionation into silicon and silicon dioxide doped with lithium at the same time to form $Li_4SiO_4$, and silicon as a silicon-silicon dioxide-lithium composite having such a structure that silicon grains having a size of 0.5 to 50 nm in an atomic order and/or crystallite state are dispersed in silicon dioxide, disintegrating the silicon-silicon dioxide-lithium composite for providing a silicon-silicon dioxide-lithium composite ground to a predetermined particle size, and performing thermal CVD on the silicon-silicon oxide-lithium composite particles at 900° C. to 1,400° C. with an organic hydrocarbon gas and/or vapor, for coating the composite particles with carbon in a coating weight of 5 to 50% by weight based on the weight of the surface-coated composite particles, wherein said reaction between silicon oxide and metallic lithium and/or an organolithium compound is conducted by feeding the mixture of silicon oxide and metallic lithium and/or the organolithium compound in a jar of a planetary ball mill, operated for milling and reaction, so that the temperature within a jar is controlled at about 40 to 120° C. during the reaction.

8. The method of claim 7, wherein the reaction between silicon oxide and metallic lithium and/or an organolithium compound is effected at a temperature equal to or lower than 1,200° C.

9. The method of claim 7, wherein the metallic lithium is a stabilized lithium powder.

10. The method of claim 7, wherein the reaction between silicon oxide and metallic lithium and/or an organolithium compound is controlled such that the amount of metallic lithium is Li/O<2.

11. The method of claim 7, wherein the reaction between silicon oxide and metallic lithium and/or an organolithium compound is conducted by using reactor which is sealed with an inert gas, designed for heat dissipation, and capable of mixing under high shear stresses.

12. The method of claim 7, wherein the silicon-silicon dioxide-lithium composite has a metallic silicon content of 20 to 44% by weight, silicon dioxide content of 55 to 70% by weight, and lithium content of 1 to 20% by weight, and an average particle size of 1 to 50 μm.

13. A negative electrode material for use in a non-aqueous electrolyte secondary cell, comprising the silicon-silicon dioxide-lithium composite obtained by the method of claim 1.

14. A negative electrode material for use in a non-aqueous electrolyte secondary cell, comprising a mixture of the silicon-silicon dioxide-lithium composite obtained by the method of claim 1 and a conductive agent, the mixture containing 1 to 60% by weight of the conductive agent and having a total carbon content of 5 to 90% by weight.

15. A negative electrode material for use in a non-aqueous electrolyte secondary cell, comprising the conductive silicon-silicon dioxide-lithium composite obtained by the method of claim 7.

16. A negative electrode material for use in a non-aqueous electrolyte secondary cell, comprising a mixture of the conductive silicon-silicon dioxide-lithium composite obtained by the method of claim 7 and a conductive agent, the mixture containing 1 to 60% by weight of the conductive agent and having a total carbon content of 5 to 90% by weight.

* * * * *